United States Patent Office 2,986,476
Patented May 30, 1961

2,986,476

ARTIFICIALLY COLORED GRANULES AND METHOD OF MAKING SAME

Per A. Larssen, Tustin, Calif., assignor to Central Commercial Company, Chicago, Ill., a corporation of Illinois No Drawing. Filed Aug. 10, 1959, Ser. No. 832,496

14 Claims. (Cl. 117—100)

This invention relates to improvements in processes for artificially coloring surfacing granules and more particularly to processes for artificially coloring granules of hard minerals employed in the roofing industry for decorating and protecting asphalt roofing, siding and shingles.

This application is a continuation in part of my co-pending application, Serial No. 531,590, filed August 30, 1955, now abandoned.

The invention is more specifically directed to an improvement upon processes of the prior art wherein crushed and screened mineral base materials are heated and/or chemically treated to form on the exterior surfaces thereof a water insoluble, non-fused or non-glazed colored coating as the reaction product of an alkali silicate such as sodium silicate and a reactant, which reactant, in the prior processes, has been one or more of the group comprising cryolite, clay, feldspar, aluminum fluoride, sodium fluosilicate, sodium fluo-borate, etc.

The preferred exemplified embodiment of my invention is a method for artificially coloring surfacing granules at temperatures in the range of 250° F. to about 1000° F., employing organic and inorganic pigments that are compatible with soluble silicate such as sodium silicate, and whereby, as taught herein, a much smaller amount of silicate is required to be used than heretofore considered practical for forming on the granule a silicate film having the necessary weather resistant properties. The base granule may be most any of the hard rocks such as slate, diabase, andesite, greystone, hepheline-syenite, rhyolite, meta-basalt, metarhyolite, and certain of the quartzites.

The herein disclosed invention has for its purpose an improvement upon processes of the prior art such as the processes disclosed in the Grove Patent No. 2,591,149 and in the Buzzell Patent No. 2,614,051. In the Grove patent there is applied to the granules a solution of alkali silicate containing a reactant such as cryolite or aluminum fluoride in an amount insufficient to completely react with and insolubilize the silicate when the granules are heated to a temperature of not higher than 600° F., following which the granules are treated with a solution of an insolubilizing agent such as aluminum chloride to substantially completely insolubilize the silicate and form on the granules a water insoluble colored coating comprising the reaction product of the above named substances.

In the Buzzell process, Patent No. 2,614,051, a coating mixture consisting only of pigment and an aqueous alkali silicate is applied to base granules and the granules heated to temperatures not above 600° F., following which there is applied to the granules while at elevated temperatures a neutralizing solution, such as a mixture of aluminum chloride, ammonium chloride and boric acid, or aluminum chloride and boric acid.

The herein claimed invention is also an improvement upon the process disclosed in the Jewett Patent No. 2,378,927 in which the insolubilizing agent is either clay, cryolite, feldspar, aluminum fluoride, sodium fluosilicate or a similar reactant as an ingredient of a solution of sodium silicate, which solution, when applied to mineral roofing granules followed by heat treatment of the granules at temperatures of from 850° to 1050° F., forms on the surfaces thereof a water insoluble colored coating.

The herein claimed invention is also an improvement upon the process disclosed in the Buzzell Patent No. 2,417,058 wherein sodium silicate provides the bond in a solution in which the reactants are aluminum fluoride, sodium silico-fluoride, and white Portland cement and the pigmenting material phthalocyanine combined with other pigments including the chromium or iron oxides and compounds, titanium oxide or other opaque material. A coating of these materials is applied to the granules and insolubilized thereon by heating the granules to a temperature not above 600° F.

In certain of the above named prior art processes substantial amounts of sodium silicate are required as the bonding medium. The reactant is one or a combination of materials selected from a group of common reactants consisting of cryolite, sodium fluosilicate, sodium fluoborate or the like, which materials in themselves have been found to contribute to the formation of soluble sodium salts in the granule system, thereby increasing the tendency for crystals to develop on the surface of the resultant reaction product on weathering, in positions where the granules are not exposed to the action of rain which would remove same. Consequently, in silicate processes of the prior art in which any of the above named or other common reactants are employed, the resultant product of the process is relatively high in soluble salts.

The essence of the herein claimed silicate coating is the use of metallic aluminum, preferably aluminum powder comprising very fine individual particles of aluminum of substantially globular shape, approximately of an average particle size of 5 microns, all but a trace thereof passing a 44 micron sieve (325 mesh), which insures a necessary large surface for reaction between tthe aluminum oxide on the surfaces of the particles of the powder and the silicate. Aluminum powder when used with sodium silicate as taught herein satisfactorily overcomes the disadvantages existing in granules produced by said prior processes and, in addition thereto, causes to be formed on base granules silicate films of greatly improved strength and stability. Such powder is commercially known as Brand No. 140, manufactured by Aluminum Company of America, Pittsburgh, Pennsylvania, or an equivalent thereof, commercially known as Brand No. 400, manufactured by Reynolds Metals Company, Richmond, Virginia.

To the best of my knowledge aluminum oxide has never before been used as a reactant with sodium silicate in methods of the prior art for producing artificially colored mineral surfacing granules at temperatures in the order of from 250° F.–1000° F.

Among the experiments conducted to ascertain the active ingredient in aluminum powder and the result attending use thereof, the following are illustrative:

(1) One part of aluminum powder and thirty-five parts of sodium silicate were mixed and applied to two thousand (2000) parts of granules. After drying in an atmosphere essentially free of carbon dioxide, the granules were heated to 500° F. plus or minus 10° for approximately five minutes.

(2) In an experiment sodium silicate alone and sodium silicate with No. 140 dust collector fines and with No. 606 powder were prepared in the 35:1 ratio and allowed to stand for several days. During this time all these metals formed a glassy substance which was crushed through —100 mesh and examined by X-ray. No crystalline phases could be detected in any of the samples prepared in this manner.

(3) In another experiment, the metals after mixing were sealed in an aluminum container, and after one week there was no indication of any hydrogen pressure, verifying the fact that no hydrogen evolution occurs as would be expected if the reaction were between the aluminum and the alkali of the silicate.

(4) Experiments to determine the durability of the silicate film consisted in etching (2" x 2") two-inch by two-inch aluminum panels in 15% caustic and drying. The samples after weighing were immersed in a solution either of sodium silicate alone or sodium silicate containing an additive in the ratio of thirty-five grams of silicate to one gram of additive. After dripping, the samples were allowed to air dry for twenty-four hours, then were dried in an oven at 100° C. for two hours, following which they were baked at 500° F. (260° C.) for ten minutes. The samples were again weighed and immersed in distilled water at room temperature for fifty-two hours. After immersion they were again dried and weighed to determine the weight loss during this treatment. The metals tested included sodium silicate, sodium silicate with No. 140 dust collector fines, sodium silicate with No. 606 powder, sodium silicate with hydrated alumina C-730, and sodium silicate with equal parts of No. 140 powder and C-730 hydrated alumina. It was found that the loss during the immersion treatment was greater with the sodium silicate alone than with the additives. The addition of C-730 hydrated alumina to the sodium silicate diminishes the loss by approximately 60%. These results indicate that addition of aluminum oxide rather than aluminum powder is responsible for the increased stability of the silicate film, apparently due to the formation of a sodium-aluminum silicate.

Experiments using C-730 alumina hydrate indicate that it takes approximately ten times the weight of alumina hydrate to give the same reenforcement on the silicate film as is obtained from the atomized aluminum powder, which would seem to indicate that (a) the aluminum oxide on the surface of the particles of aluminum powder is more effective than the equal amount of C-730 alumina hydrate and (b) only a small part of the C-730 alumina hydrate is in such form as to be effective.

Certain of the more important objects of the invention are:

(1) The production by a batch, semi-continuous or continuous processing procedure of a low cost, artificially colored granule of superior quality and unique properties;

(2) The production of a surfacing granule, the coating on which is characterized by its color uniformity, relatively low porosity, good weather resistance, and low soluble salt content; and (3) The manufacture of a low cost, artificially colored granule having bonded to the surface thereof a color and metal bearing insolubilized silicate film characterized by its strength and stability and low soluble salt content.

I have discovered that a small amount of aluminum powder used with a soluble pigmented silicate causes to be formed on base granules metal-bearing silicate films, and that as distinguished from common reactants such as cryolite, clay, feldspar, aluminum fluoride and other commonly employed reactants, less silicate can be used than heretofore considered practical, and that the film is characterized by its superior strength, stability and non-blooming properties, the latter by reason of the smaller amount of silicate required, and the fact that the aluminum powder itself does not develop soluble salts.

To this point in the description of my invention, reference has been made to use of atomized aluminum powder of the aforementioned particle size and form. The term powder as used herein shall include flake type (unpolished) aluminum untreated with organic matter such as stearic acid or similar material, which has been found equally effective for the purpose of my invention but not as desirable in that it floats readily in the air and tends to form an explosive mixture and therefore presents a greater fire hazard in manufacturing.

With further reference to use of fine powdered aluminum and the functional advantages of this combined reactant and film-strengthening agent as compared with the disadvantages attending use (for example) of cryolite employed in prior processes solely as a reactant, there is the added advantage which is, that one pound of aluminum powder currently costing thirty-four cents ($0.34) produces a silicate film equal in stability to a film produced with approximately four pounds of cryolite currently costing sixty-five cents ($0.65). Increasing the amount of aluminum powder from about three-fourths (¾) of a pound per ton of granules to two pounds, more or less, per ton of granules has been found to result in a film of greater stability as determined by the boil test accepted in the roofing industry as standard for commercial granules of high quality. In view thereof, the degree of stability of the resultant silicate film can be controlled by empirical procedures, and it is therefore understood that the invention shall not be limited in this respect. It suffices to say that for exacting requirements of the trade, the amount of the powder ordinarily need not exceed about two pounds.

In carrying the invention into practice, a relatively non-porous rock such as andesite, crushed and screened to the desired granule size, generally to pass a "10-mesh" screen and be retained on a "35-mesh" screen, is an illustration of a suitable base granule material on which green coatings have been satisfactorily formed from a solution comprising the following materials:

| | Pounds |
|---|---|
| N Brand sodium silicate | 20.0 |
| Water | 25.0 |
| Phthalocyanine Green paste | 1.7 |
| Iron Oxide Yellow | 0.9 |
| Chromic Oxide Green | 9.3 |
| Aluminum powder | 0.75 |
| Total pounds | 57.65 |

The above materials, in the amounts given, are thoroughly mixed to form a pigmented solution of sodium silicate which is applied to one ton (2000 pounds) of granules which, preferably but not necessarily, have been preheated to 155° to 160° F.

The granules may be colored by mixing same and the coating together in any well known manner common in the art, and then heated in a rotary kiln to a discharge temperature of from above 250° F. to not above 500° F., preferably about 450° to about 500° F. If desired, a neutralizing solution may be applied to the granules either while they are cooling or after they have cooled. The solution may consist of aluminum chloride, ammonium chloride, calcium chloride, hydrochloric acid or equivalent substances. To increase adherence of the granules to asphalt, the granules may be oiled with a small amount of mineral oil, as is also known in the art.

Black granules may be similarly manufactured from a solution consisting of the following materials:

| | Pounds |
|---|---|
| N Brand sodium silicate | 35.0 |
| Water | 10.0 |
| Carbon black | 3.5 |
| Graphite | 5.0 |
| Dispersing agent | 0.1 |
| Aluminum powder | 1.0 |
| Total pounds | 54.6 |

The base material may be andesite or any of the common hard rocks, and the solution in the amount above named applied to the granules and the granules (2000 pounds) subjected to the same treatment as that set forth in the manufacture of green granules, except that the kiln discharge temperature shall be from 450° F. to about 540° F.

Whilte granules may be similarly manufactured from a solution consisting of the following materials:

| Material | Pounds |
|---|---|
| N Brand sodium silicate | 55.0 |
| Water | 25.0 |
| Titanium dioxide | 50.0 |
| Aluminum powder | 1.5 |
| Total pounds | 131.5 |

The base material may also be andesite or any of the common hard rocks, and the solution in the amount above named applied to 2000 pounds of granules and the granules subjected to the same procedure as in the manufacture of green and black granules, except that the kiln discharge temperature shall be from about 450° F. to about 700° F.

Investigation and extensive tests show that when colored sodium silicate coatings are produced according to the aforementioned prior processes, that is to say, mixtures consisting of large amounts of sodium silicate and a reactant such as cryolite or earlier mentioned reactants, bloom is formed on the granules as a result of efflorescence of an excess of soluble sodium salts. Attempts have been made to prevent this by using smaller amounts of sodium silicate. This showed that while there was less tendency of the coating to bloom, the silicate film was inferior in necessary strength and stability to the granule produced by the herein described process.

In processes of the prior art wherein a solution of aluminum chloride is applied to granules after heat treatment of the granules to react the sodium silicate with a reactant such as cryolite, carefully conducted tests showed that bloom was formed by efflorescence of sodium chloride crystals, the chloride ions coming from the aluminum chloride, and the sodium ions from the silicate and the reactant. In these experiments and tests, it was discovered that by substituting a small amount of fine aluminum powder for relatively large amounts of such reactants as cryolite and by reducing the amount of the silicate, the following results were obtained:

(1) There was a definite reaction between the small amount of aluminum oxide and the small amount of sodium silicate which produced a non-blooming sodium silicate film of improved integrity as evidenced by the boil test and compared with silicate films in which the reactant was a comparable amount of cryolite, aluminum fluoride or another one of the previously mentioned reactants, and that the manufacturing cost was appreciably less. It was found that the excess of unreacted aluminum powder, free of the oxide, was dispersed in the silicate to form a metal-bearing coating of a structural formation quite different from that heretofore formed by use of excess amounts of the common reactants, such as cryolite.

(2) As compared with more involved and more costly processes of the prior art employing reactants including large amounts of aluminum fluoride, large amounts of sodium silicate and one or more additional reactants, the herein claimed process consists of only two materials, namely, sodium silicate and aluminum powder as essential constituent materials of a pigmented coating solution for use in the treatment of granules by a continuous operation.

Reference has been made herein to use of flake type aluminum in lieu of atomized aluminum powder, the particle size of which is approximately 5 microns. This type of aluminum may vary over quite a wide range in particle size and still be satisfactory for the purpose of the invention, the variation in particle size ranging from approximately 100 mesh down to all of the aluminum passing a 325 mesh screen. Most satisfactory results are obtained by using 0.02 to 0.06 pound of aluminum powder per pound of the sodium silicate herein described. The effectiveness varies roughly with the amount of aluminum powder used, and for this reason it is not intended that the invention shall be limited in this respect.

The dispersing agent named in the formula for manufacturing black granules is the sodium salt of an alkyl aryl sulfonate condensation product which is manufactured under the trade name "Lomar PW" by Jacques Wolf & Company of Passaic, New Jersey.

In the embodiment of my invention wherein a neutralizing agent such as aluminum chloride or the equivalent there of is employed, the amount of the neutralizer may be determined empirically. For economical operations the preferred type of neutralizing agent is a 32° Bé. solution of aluminum chloride. This solution is, preferably but not necessarily, applied to the granules while at about 130° to 145° F. at a rate generally of one pound of the solution per three pounds of sodium silicate through a rotary mixer followed by drying the granules through a rotary dryer, the granules emerging from the dryer at about 130° to 140° F. Also for economy in operations, N Brand sodium silicate is preferred, but it shall be understood that other equivalent silicates can be employed with satisfactory results. A silicate having an $SiO_2$ to $Na_2O$ ratio of 2 to 1 produces highly satisfactory results.

I place particular emphasis upon the feature of my invention which consists in use as taught herein of finely divided untreated aluminum powder, the individual particles of which contain aluminum oxide, the fineness of the powder providing a very wide surface for reaction of the oxide with the silicate in the heat treatment of the granules, and, secondly, that the particles of aluminum remaining in the solution after the oxide has reacted with the silicate are dispersed through the silicate and contribute structural strength to the resultant silicate films, which are (1) the reaction product of the oxide with the silicate and (2) treatment of the coated granules with a solution of an acidic neutralizer. These factors are highly important and the advantages several-fold, bearing in mind particularly that the objective is the disclosed use of less silicate than previously considered practical thereby reducing the soluble salt content in the end product of the method, supplemented by the fact that the aluminum oxide itself does not develop soluble salts.

The invention, in its broadest aspect, reflects in discovering that a small amount of aluminum oxide employed as a reactant with an alkali silicate enables using far less silicate than heretofore considered practical and that at temperatures in the order of from 250°–800° F., coatings meeting exacting requirements of the roofing industry can be produced when followed by treatment to neutralize the alkalinity of the silicate. However, when the temperatures are in the order of from 800° F. to not substantially above 1000° F., equally acceptable granules may be made without subsequent treatment to neutralize the alkalinity of the silicate.

What I claim as my invention is:

1. The method of artificially coloring mineral surfacing granules which comprises substantially completely wetting the surfaces of the granules with an aqueous solution of sodium silicate, coloring pigment and finely divided untreated aluminum powder containing aluminum oxide on the surfaces of the individual particles thereof, the amount of the powder being only sufficient to react with the silicate and leave dispersed in the solution unreacted particles of the powder; and a reactant consisting of heating of the granules at temperatures not substantially above 1000° F. to react the aluminum oxide with the silicate and form on the surfaces of the granules colored weather-resistant silicate films having in corporated therein unreacted particles of said powder.

2. The method according to claim 1, wherein the average particle size of the aluminum powder is 5 microns providing a large surface of contact of the aluminum oxide with the silicate.

3. The method according to claim 1, wherein the average particle size of the aluminum powder is 5 microns and the amount thereof is not substantially more than 2.0 pounds per ton of granules.

4. The method according to claim 1, wherein the average particle size of the aluminum powder is 5 microns and the amount thereof is not substantially more than 2.0 pounds and the amount of the silicate not substantially more than 20.0–55.0 pounds per ton of granules.

5. The method of artificially coloring mineral surfacing granules of improved structural strength and stability which comprises substantially completely wetting the surfaces of the granules with an aqueous solution of sodium silicate, coloring pigment, and a reactant and film strengthening substance consisting of finely divided untreated aluminum powder containing aluminum oxide on the surfaces of the individual particles thereof, the amount of the powder being only sufficient to react with the silicate and leave in the solution unreacted particles of the powder; and heating the granules at temperatures in the order of from 250° F. to 800° F. to react the aluminum oxide with the silicate and form on the surfaces of the granules colored silicate films having incorporated therein the unreacted particles of said powder, and chemically setting the silicate by applying to the granules an acidic solution of a neutralizing agent.

6. The method according to claim 5, wherein the average particle size of the aluminum powder is 5 microns providing a large surface of contact of the aluminum oxide with the silicate.

7. The method according to claim 5, wherein the average particle size of the aluminum powder is 5 microns and the amount thereof is not substantially more than 2.0 pounds per ton of granules.

8. The method according to claim 5, wherein the average particle size of the aluminum powder is 5 microns and the amount thereof is not substantially more than 2.0 pounds and the amount of the silicate not substantially more than 20.0–55.0 pounds per ton of granules.

9. The method according to claim 1, wherein the amount of the aluminum powder is substantially from 0.02 to 0.06 pound per pound of the sodium silicate.

10. The method according to claim 1, wherein the amount of the silicate is substantially from three-fourths of a pound to not substantially more than two pounds, and the aluminum power is substantially from 0.02 to 0.06 pound per pound of said silicate.

11. The method according to claim 1, wherein the amount of the aluminum powder is from about 0.75 pound to 2.0 pounds and the silicate is from about 20.0–55.0 pounds per ton of granules.

12. The method according to claim 5, wherein the amount of the aluminum powder is substantially from 0.02 to 0.06 pound per pound of the sodium silicate.

13. The method according to claim 5, wherein the amount of the aluminum powder is from about 0.75 pound to 2.0 pounds and the silicate is from about 20.0–55.0 pounds per ton of granules.

14. The herein described low-temperature method of forming non-fused, non-blooming color and metal-bearing weather resistant silicate films of low alkalinity on mineral surfacing granules, comprising mixing together the granules and an aqueous solution of a coating consisting of sodium silicate, coloring pigment and a reactant and film strengthening substance consisting of finely divided aluminum powder whose individual particles contain aluminum oxide on their surfaces, the powder being in an amount only sufficient to react the aluminum with the silicate at temperatures within the range of 250°–1000° F. and retain unreacted powder in the solution as a film strengthening metal; firing the granules at temperatures within the aforestated range to dehydrate the silicate and react the aluminum oxide with the silicate; and applying to the granules an acidic solution to neutralize the free alkali and form on the granules insolubilized, non-fused, non-blooming color and metal-bearing weather-resistant silicate films of low alkalinity.

References Cited in the file of this patent

UNITED STATES PATENTS

| | | |
|---|---|---|
| 2,094,452 | Hillers | Sept. 28, 1937 |
| 2,614,051 | Buzzell et al. | Oct. 14, 1952 |
| 2,664,405 | Anderson et al. | Dec. 29, 1953 |
| 2,695,851 | Lodge | Nov. 30, 1954 |
| 2,932,311 | Hartwright | Jan. 24, 1956 |